US008249144B2

(12) United States Patent
Gutman et al.

(10) Patent No.: US 8,249,144 B2
(45) Date of Patent: Aug. 21, 2012

(54) DISTRIBUTED TRANSCODING

(75) Inventors: Ron Gutman, Encinitas, CA (US);
Doron Segev, Tel-Aviv (IL); Noam Eshkoli, Tel-Mond (IL)

(73) Assignee: Imagine Communications Ltd., Netanya (IL)

( * ) Notice: Subject to any disclaimer, the term of this patent is extended or adjusted under 35 U.S.C. 154(b) by 942 days.

(21) Appl. No.: 12/217,836

(22) Filed: Jul. 8, 2008

(65) Prior Publication Data
US 2010/0008421 A1    Jan. 14, 2010

(51) Int. Cl.
*H04N 7/12* (2006.01)
(52) U.S. Cl. ............................ 375/240.01; 375/240.26
(58) Field of Classification Search .................. None
See application file for complete search history.

(56) References Cited

U.S. PATENT DOCUMENTS

| | | | |
|---|---|---|---|
| 5,926,573 A | 7/1999 | Kim et al. | |
| 6,560,282 B2 | 5/2003 | Tahara et al. | |
| 6,577,764 B2 | 6/2003 | Myler et al. | |
| 6,829,005 B2 | 12/2004 | Ferguson | |
| 6,943,827 B2 | 9/2005 | Kawada et al. | |
| 7,266,148 B2 | 9/2007 | Kim et al. | |
| 7,881,384 B2 * | 2/2011 | Cote et al. ............... | 375/240.16 |
| 2005/0053288 A1 | 3/2005 | Srinivasan et al. | |
| 2006/0153301 A1 | 7/2006 | Guleryuz | |
| 2006/0280372 A1 | 12/2006 | Han | |
| 2007/0025448 A1 | 2/2007 | Cha et al. | |
| 2007/0071096 A1 * | 3/2007 | Chen et al. ............... | 375/240.12 |
| 2007/0217520 A1 | 9/2007 | Kim et al. | |
| 2008/0075165 A1 | 3/2008 | Ugur et al. | |
| 2008/0101473 A1 * | 5/2008 | Tanaka et al. ........... | 375/240.16 |
| 2008/0137741 A1 * | 6/2008 | Kalva ...................... | 375/240.12 |
| 2009/0034622 A1 | 2/2009 | Huchet et al. | |
| 2009/0323813 A1 | 12/2009 | Maciel de Faria et al. | |
| 2010/0278231 A1 | 11/2010 | Gutman et al. | |

FOREIGN PATENT DOCUMENTS

GB    2365647    2/2002

OTHER PUBLICATIONS

Wang, Y., "Survey of Objective Video Quality Measurements", EMC Corporation, Mar. 28, 2006.
Wang et al., "Image Quality Assessment: from error visibility to structural similarity", IEEE Transactions on Image Processing; vol. 13, issue 4, pp. 600-612, Apr. 2004.
Wolf et al., "Video Quality Measurement Techniques", NTIA Report TR-02-392, Jun. 2002.

* cited by examiner

*Primary Examiner* — Hong Cho
(74) *Attorney, Agent, or Firm* — D. Kliger I.P. Services Ltd.

(57) ABSTRACT

A method of delivering a video stream, including encoding a video stream into a first encoded stream and selecting encoding parameter values for subsequent transcoding the first encoded stream into a specific second encoded stream. Furthermore, the method includes transmitting the first encoded stream with the selected encoding parameter values to a transcoder over a standard communication network, transcoding the first encoded stream into a second encoded stream having the selected parameter values and forwarding the second encoded stream.

35 Claims, 4 Drawing Sheets

DISTRIBUTED TRANSCODING

FIELD OF THE INVENTION

The present invention relates to communication systems and in particular to systems for delivery of video signals.

BACKGROUND OF THE INVENTION

One of the usages of communication networks, such as cable television, the Internet and the like, is the distribution of movies in the form of video streams. Video streams are formed from a sequence of frames (i.e., still images), with corresponding display times. The transmission of video streams requires wide bandwidth and therefore video streams are generally compressed before transmission. Various compression methods, also referred to sometimes as encoding methods, have been defined. One popular compression technique is the MPEG-2 compression method. Another technique, generally considered to give better compression ratios is the H.264 method.

In some cases it is desired to change the compression of a video stream along a path from a server to a client, for example in order to match it with the capabilities of the client and/or with the network conditions. Such changing of the compression is often referred to as transcoding.

US patent publication 2007/0121651 to Casey et al., published May 31, 2007, the disclosure of which is incorporated herein by reference, describes a network based converter, which is adapted to convert multimedia signals between various formats, for example between MPEG-2 and H.264 formats, on the fly.

The compression of video streams typically involves a first stage of identifying information, of a sufficient quantity, which can be dropped with minimal loss to the image quality and a second stage in which the compression is performed based on the information from the first stage. Depending on the compression method, in the first stage, parameter values indicating how each frame is to be represented in the compressed form are selected. For example, quantization parameter values indicate how many bits are to be used to represent the data of each frame or of portions thereof.

The first stage of the compression is generally processing power intensive, and requires expensive hardware for real time, on-the-fly compression. Cheaper hardware can sometimes be used by selecting compression parameter values from a smaller set of possibilities, but this may result in less efficient compression.

FIG. 1 is a schematic illustration of a video delivery system 100 of the prior art. An encoder 102 prepares a compressed video stream in accordance with a first compression format. The compressed video stream is transmitted over a network 108 to a transcoder 110, which transcodes the video stream into a second size and/or format, for transmission to a client 112. Transcoder 110 generally comprises a decoder 120 which partially or entirely decodes the compressed video stream; a parameter selector 122, which selects parameter values for the transcoding; and an encoding engine 124, which performs the actual compression.

U.S. Pat. No. 6,542,546 to Vetro et al., titled: "Adaptable compressed bitstream transcoder", the disclosure of which is incorporated herein by reference, describes a video transcoder adapted to operate in a plurality of transcoding modes. A manager of the transcoder dynamically selects one of the transcoding modes to be used, according to the content of the video stream transcoded and the network conditions.

US patent publication 2005/0232497 to Yogeshwar et al., published 20 Oct. 2005, the disclosure of which is incorporated herein by reference, describes a transcoding technique for translating from a first compression format to a second compression format. The transcoding technique uses compression parameters of the first format in selecting compression parameters of the second format. In one embodiment, the transcoding is performed from MPEG-2 to H.264.

US patent publication 2001/047517 to Christopoulos et al., published Nov. 29, 2001, the disclosure of which is incorporated herein by reference, describes a transcoding method in which a video stream is provided to a transcoder with transcoding hints. The transcoder encodes the video stream to fit onto a channel leading to the client, based on client capabilities and link characteristics of the channel, using the provided hints.

The methods referred to hereinabove may reduce the complexity of the transcoder to some extent, but due to the increasing complexity of advanced compression methods, transcoders are still quite complex and expensive.

Other patent publications which may be of interest include US patent publication 2005/0276580 to Zacek, published 15 Dec. 2005, EP patent application 1,069,770 to Tomson Licensing S.A., published 17 Jan. 2001, EP patent application 1 439 707 to Broadcom Corporation, filed 19 Jan. 2004, and US patent publication 2007/0147440 to Song et al., published Jun. 28, 2007, the disclosures of all of these are incorporated herein by reference.

SUMMARY OF THE INVENTION

An aspect of some embodiments of the present invention relates to a method of transcoding a video stream in which a transcoder transcodes video streams using parameter values received with the video streams.

In some embodiments of the invention, parameter values are received for at least 90% of the video stream or even for at least 99% of the video stream. Optionally, the received parameter values relate to one or more of motion vectors, quantization values and macro-block type. Optionally, the received parameter values are derivable from the received video stream, but are received with the video stream in order to reduce the processing resources required by the transcoder. Alternatively, the received parameter values are derived from a higher quality (e.g., original) version of the received video stream before it was compressed, and derivation of the parameters from the received video stream will result in a lower quality transcoding.

In some embodiments of the invention, the transcoder receives parameter values for substantially all the parameters required for encoding, such that the transcoder does not select parameter values, at least for 90% or even at least for 99% of the video stream. Reducing or even removing the parameter value selection task of the transcoder makes the transcoder simpler, albeit perhaps at the cost of reducing or even removing the ability of the transcoder to adjust the transcoding to the network and/or client capabilities. If necessary, an additional transcoding stage may be used to adjust the transcoded video stream to network or client conditions.

In some embodiments of the invention, the transcoding includes changing a compressed video stream from a first compression format to a second format. The second compression format is optionally less compact than the first compression format, for equivalent quality, on the average.

The parameter values are optionally supplied to the transcoder in headers of the packets of the compressed format.

Supplying the parameter values with the video stream to the transcoder allows central selection of the parameter values, such that the cost of the hardware required for performing the selection is much lower than that required for employing strong compression units in each transcoding location. In addition, the supplying of the parameter values from a central location allows precise control of the quality of the video stream reaching the clients.

An aspect of some embodiments of the invention relates to a method of video stream transcoding by a transcoder, in which motion vector values are identified in advance and transmitted to the transcoder, rather than being identified by the transcoder.

There is therefore provided in accordance with an exemplary embodiment of the invention, a method of delivering a video stream, comprising encoding a video stream into a first encoded stream, selecting compression parameter values for transcoding of the first encoded stream into a specific second encoded stream, transmitting the first encoded stream with the selected compression parameter values to a transcoder over a standard communication network, transcoding the first encoded stream into a second encoded stream having the selected parameter values and forwarding the second encoded stream.

Optionally, transmitting the first encoded stream comprises transmitting over a distance of at least 1 kilometer. Optionally, transmitting the first encoded stream comprises transmitting to a plurality of transcoders. Optionally, transmitting the first encoded stream comprises transmitting over an Ethernet, IP cable or satellite network. Optionally, transcoding the first encoded stream into a second stream comprises decoding the first encoded stream into a non-compressed stream and re-encoding the non-compressed stream into the second encoded stream. Optionally, the second encoded stream is larger than the first encoded stream by at least 20%

In some embodiments of the invention, the first and second encoded streams differ in the resolution of the video stream and/or in their compression method. Optionally, transcoding the first encoded stream into a second encoded stream comprises transcoding an H.264 stream into an MPEG-2 stream. Optionally, transmitting the first encoded stream with the selected compression parameter values comprises transmitting with all parameter values required for generating the second encoded stream. Alternatively or additionally, transmitting the first encoded stream with the selected compression parameter values comprises transmitting with fewer than all the parameter values required for generating the second encoded stream.

Optionally, transmitting the first encoded stream with the selected compression parameter values comprises transmitting with motion vector values. Optionally, transmitting the first encoded stream with the selected compression parameter values comprises transmitting values for one or more specific parameters, for more than 90% of the video stream. Optionally, the method includes transcoding the second encoded stream into a third encoded stream. Optionally, transcoding the second encoded stream into a third encoded stream comprises transcoding after the forwarding of the second stream. Optionally, transcoding the second encoded stream into a third encoded stream comprises at least partially decoding and re-encoding the stream or even decoding the second stream into a non-compressed stream and then encoding into the third encoded stream.

There is further provided in accordance with an exemplary embodiment of the invention, a method of delivering a video stream, comprising receiving, over a standard communication network, a first encoded video stream together with compression parameter values, transcoding the first encoded stream into a second encoded stream having the compression parameter values and forwarding the second encoded stream.

Optionally, receiving compression parameter values comprises receiving values of at least one compression parameter for at least 80% or even 95% of the video stream. Optionally, receiving compression parameter values comprises receiving values of at least three compression parameters for at least 80% of the video stream.

There is further provided in accordance with an exemplary embodiment of the invention, a transcoder, comprising a network interface and a processor configured to receive an encoded video stream through the network interface, together with compression parameter values and to transcode the received encoded video stream into a different encoded video stream having the received compression parameter values.

Optionally, the processor is configured to decode the received encoded video stream into a non-compressed video stream and re-encode the non-compressed video stream in transcoding the received encoded video stream.

Optionally, the processor is configured to generate the different encoded video stream substantially entirely according to received compression parameter values and without selection of parameter values.

Optionally, the processor is configured to generate the different encoded video stream with received parameter values of a plurality of different parameters for at least 90% of the video stream.

There is further provided in accordance with an exemplary embodiment of the invention, a video server, comprising an input interface for receiving video streams, an encoder configured to compress video streams received through the input interface according to a first compression format, a parameter selector configured to select values for one or more parameters of a second compression format, for the received video streams and an output interface configured to transmit compressed video streams with corresponding parameter values toward a transcoder.

Optionally, the parameter selector is configured to select only a single value for at least 95% of the parameter instances for which it selects values. Optionally, the parameter selector is configured to select only a single value for at least 99% of the parameter instances for which it selects values. Optionally, the output interface is configured to transmit compressed video streams with corresponding parameter values, including only a single value for at least one compression parameter, for at least 99% of the video stream.

BRIEF DESCRIPTION OF FIGURES

Exemplary non-limiting embodiments of the invention will be described with reference to the following description of embodiments in conjunction with the figures. Identical structures, elements or parts which appear in more than one figure are preferably labeled with a same or similar number in all the figures in which they appear, in which.

DETAILED DESCRIPTION OF EMBODIMENTS

Network Overview

Figure 2:
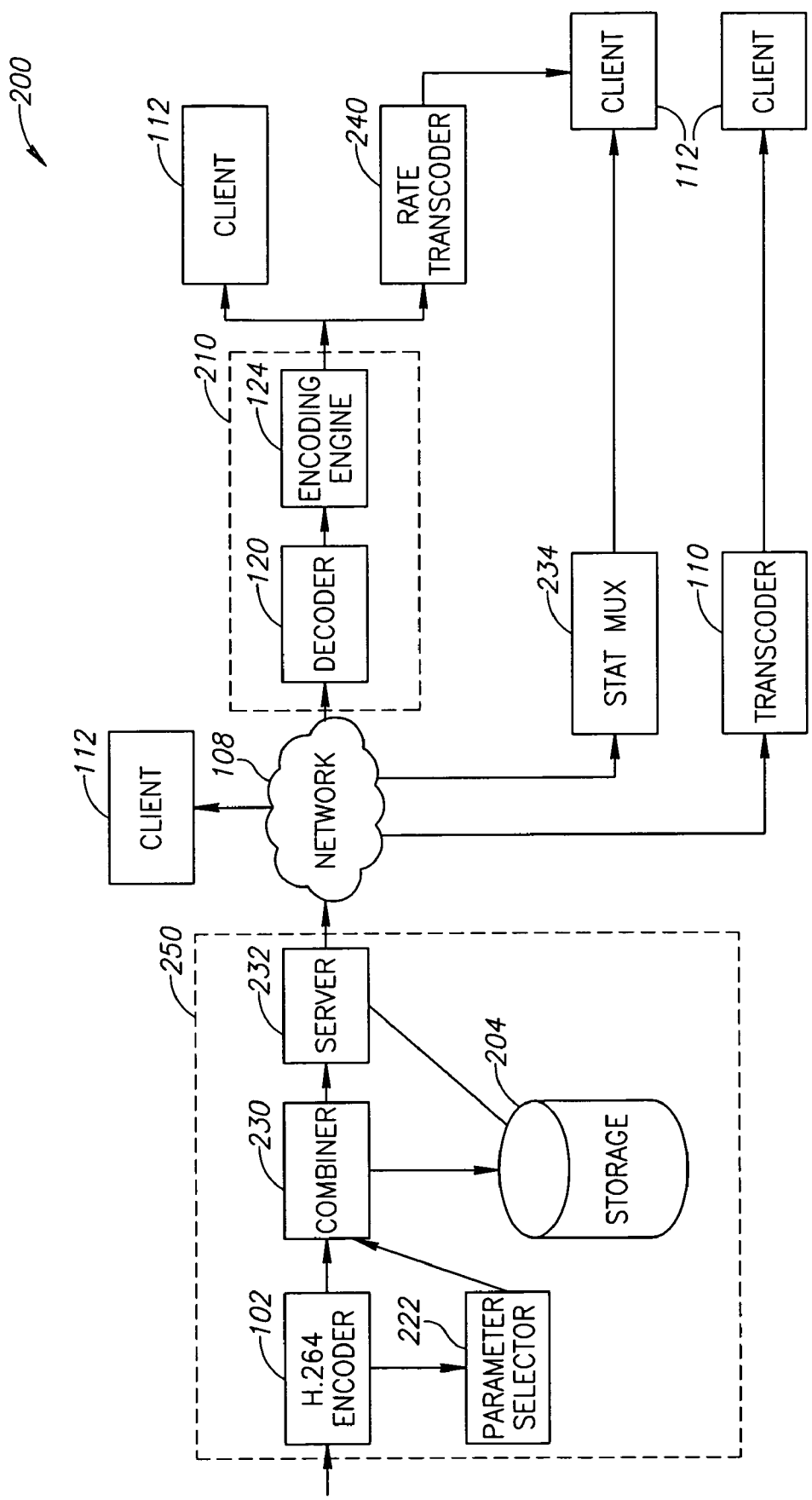
FIG. 2 is a schematic illustration of a video delivery system, in accordance with an exemplary embodiment of the invention.

FIG. 2 is a schematic illustration of a video delivery system 200, in accordance with an exemplary embodiment of the invention. System 200 includes a video processing and storage unit 250 (referred to herein as P&S unit), which compresses and transmits video streams. P&S unit 250 optionally includes an encoder 102 which is configured to receive video streams and compress them for transmission, for example in accordance with the H.264 compression method. A parameter selector 222 prepares for the compressed video stream, parameter values to be used in transcoding the compressed video stream into a second compression format, for example the MPEG-2 format. The compressed video stream and the parameter values are optionally combined by a combiner 230 into a single stream, for storage and transmission. The combined video stream may be stored in a storage unit 204 for later use or may be provided directly to a server 232, typically for real time transmission. Server 232 transmits the combined video stream toward one or more clients 112 over a network 108.

Figure 1:
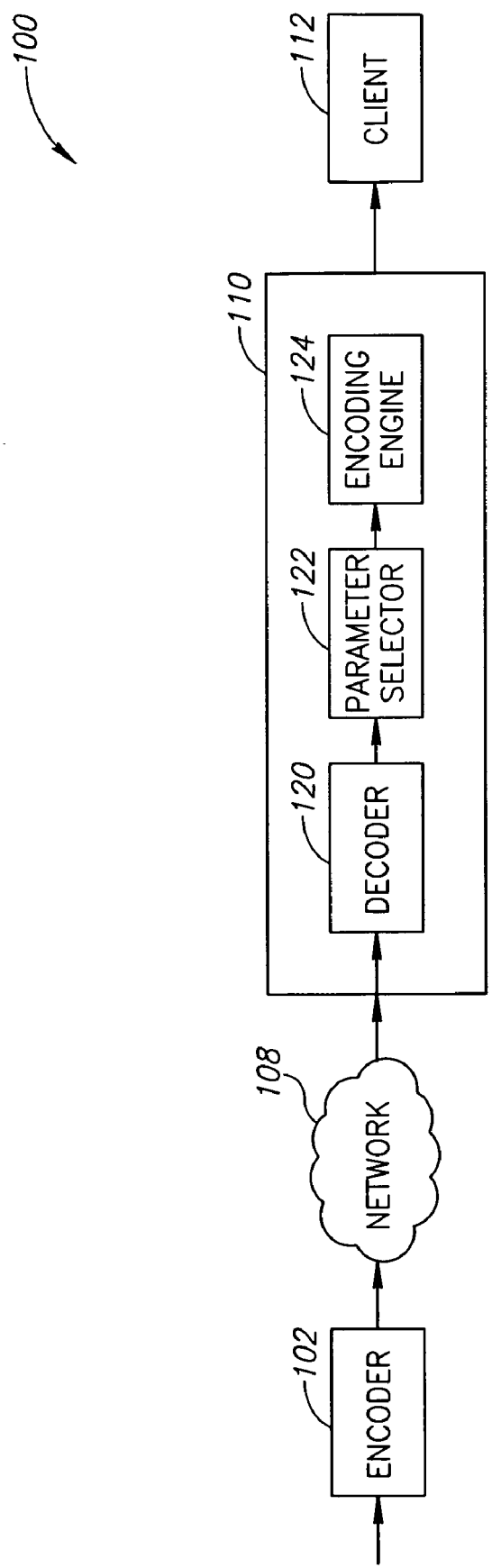
FIG. 1 is a schematic illustration of a video delivery system of the prior art.

A transcoder 210 optionally receives the combined video stream and converts it into a video stream in accordance with the second compression format, for one or more clients 112 configured to receive video streams in the second format. Transcoder 210 optionally comprises a decoder 120, which decodes the compressed video stream of the first compression format, and an encoding engine 124 which recompresses the video stream into the second compression format, according to the parameter values received in the combined video stream from parameter selector 222. Unlike prior art transcoder 110 (FIG. 1), which includes a parameter selector 122, transcoder 210 optionally does not perform parameter selection, but rather operates based on parameters selected by parameter selector 222 of P&S unit 250.

In some embodiments of the invention, the transcoded video stream from transcoder 210 is provided directly to a client 112 without further transcoding. Alternatively or additionally, for some or all of the clients, the transcoded video stream from transcoder 210 is passed to a rate transcoder 240, which adjusts the size and/or rate of the transcoded video stream to the capabilities of a transmission channel to the client 112. It was determined by the inventor of the present invention, that the double transcoding by transcoders 210 and 240 is in many cases cheaper and/or provides higher quality video data than a single transcoder 110 of the prior art.

Clients 112 supporting the first compression format are optionally provided the combined stream directly from server 232 through network 108. Optionally, the combined stream is configured such that clients supporting the first compression format view the parameter values as padding which is ignored. Alternatively or additionally, one or more clients supporting the first format receive the first compression format stream through a statistical multiplexer (Stat Mux) 234 or other network element, which extracts the compressed stream from the combined stream, for the client 112. In some embodiments of the invention, one or more clients 112 receive the video stream through prior art transcoders 110 which are not adapted to use the parameter values supplied in the combined streams. The transcoder 110 optionally ignores the parameter values in the combined stream and performs the transcoding using any method known in the art. Thus, the advantages of embodiments of the present invention described above may be achieved without replacing all the transcoders in the network.

Video Processing and Unit

Processing and storage unit 250 is optionally located entirely in a single location, possibly having some or all of its elements mounted on a single computer system. Alternatively, processing and storage unit 250 is distributed over two or more nodes of the network, with different elements thereof in different locations. Further alternatively, some of the elements shown above as belonging to P&S unit 250 are not implemented at all. For example, a unit which only operates with real time video streams may be used, in which case storage unit 204 is not required. In an exemplary embodiment of the invention, the encoding and parameter selection are performed in a first location, while storage unit 204 and server 232 are situated and implemented at a second location, possibly at least a kilometer or even at least 100 kilometers away from encoder 102. In some embodiments of the invention, storage units 204 are positioned near transcoder 210, rather than at P&S unit 250. In some embodiments of the invention, a plurality of storage units 204 and/or servers 232 are employed to service clients in different geographical locations; the storage units 204 and/or servers 232 receiving combined video streams from a single set of combiner 232, encoder 102 and parameter selector 222. In another exemplary embodiment, encoder 102 is distanced from parameter selector 222.

Figure 3:
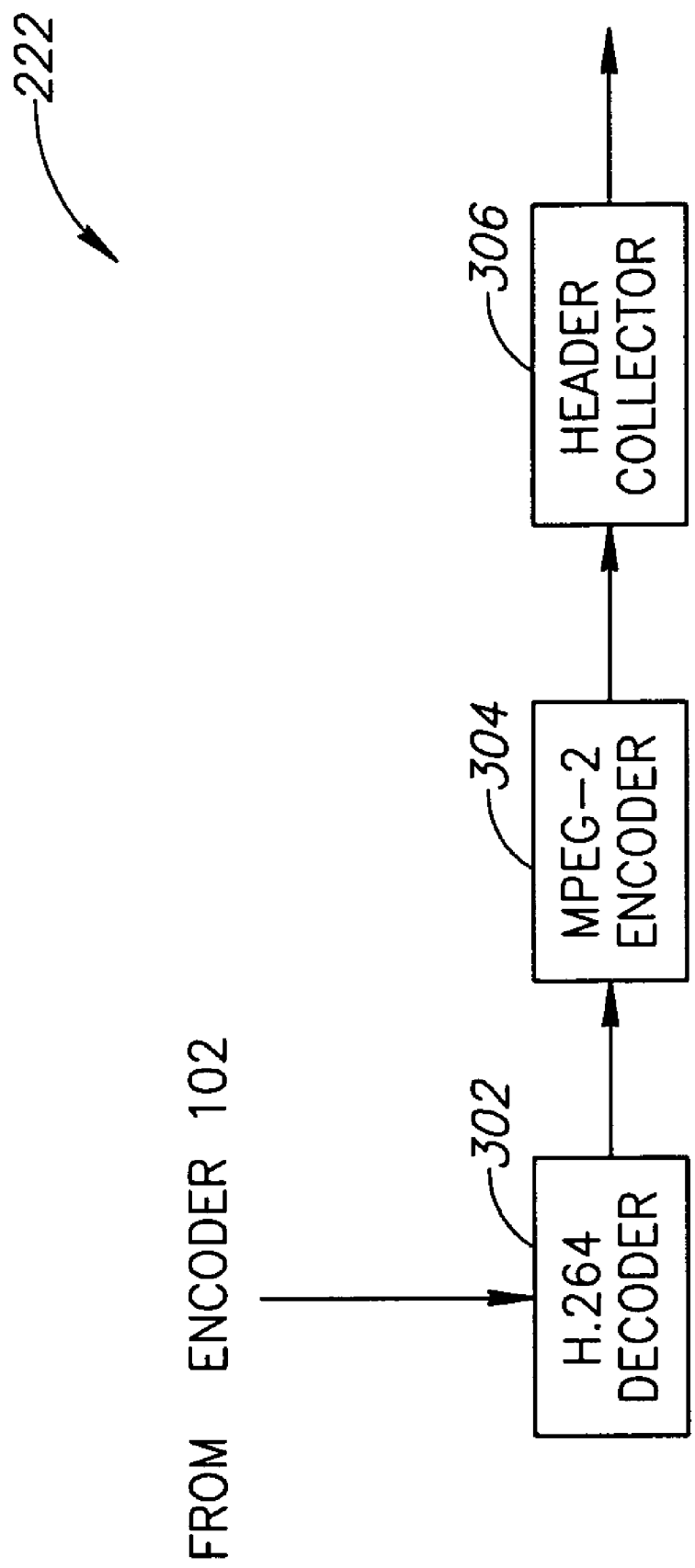
FIG. 3 is a schematic block diagram of a compression parameter selector, in accordance with another exemplary embodiment of the invention.

FIG. 3 is a schematic block diagram of parameter selector 222, in accordance with an exemplary embodiment of the invention. In the embodiment shown in FIG. 3, parameter selector 222 comprises a decoder 302 which decodes the compressed video stream from encoder 102 into a non-compressed form. The decoded non-compressed form of the video stream, passes from decoder 302 to a second format encoder 304, which compresses the decoded non-compressed form of the video stream in accordance with a different compression format. Second format encoder 304 is optionally a high performance encoder, which uses any of the methods known in the art to achieve a high quality compression in accordance with the second compression format. Rather than using the compressed result, parameter selector 222 collects the parameters used in generating the compressed result and these parameters are combined to the compressed video stream of the first format, by combiner 230 (FIG. 2). In FIG. 3, which is suitable for example in cases in which the MPEG-2 format is the second format, the collection of parameters is performed simply by a header collector 306 which collects the headers of the video units (e.g., frames, macro-blocks) of the compressed video stream, as these headers include the determined parameter values. In some embodiments of the invention, the headers themselves are combined to the the compressed video stream of the first format, by combiner 230.

As shown, second format encoder 304 operates on a compressed (by encoder 102) and decompressed (by decoder 302) version of the video stream, so that the selection of parameters will be in the same conditions as the compression of encoding engine 124 is performed. Alternatively, the parameter selection is performed on the original video stream before data is lost due to compression. Optionally, parameter selector 222 does not filter or otherwise preprocess the video stream so that the video stream on which the selection is performed is identical to the stream on which encoding engine 124 operates. Alternatively, parameter selector 222 slightly preprocesses the video stream so as to enhance the encoding, while leaving the stream on which the preprocessing is performed very close to the stream on which encoding engine 124 operates. Alternatively or additionally, the parameter values provided by parameter selector 222 include the preprocessing tasks which transcoder 210 subsequently performs on the video stream after it is decoded, before it is recompressed by encoding engine 124.

In an exemplary embodiment of the invention, the collected headers comprise frame headers which indicate the frame type of the corresponding frame (e.g., I, P or B) and timing information, such as the presentation time stamp (PTS) and/or the decoding time stamp (DTS), which can be used to correlate between the frame headers and the frames in the video stream. Alternatively or additionally, other information, such as a unique ID is used to correlate between the frame headers and the frames of the video stream.

The collected headers in this exemplary embodiment optionally further include macro-block headers which indicate for each macro-block the type of the macro-block (i.e., intra or non-intra), a motion vector of the macro-block if any and the quantization of the macro-block.

Network

The principals of the present invention may be used with substantially any network type, including satellite, cable, Ethernet, fiber, cellular and combinations thereof. The communication between P&S unit 250 and transcoder 210 is optionally performed over a standard communication link. Although P&S unit 250 and transcoder 210 may be at any distance from each other, in some embodiments of the invention, transcoder 210 is distanced from P&S unit 250 by at least 100 meters, 500 meters or even 10 kilometers. In some cases, transcoder 210 is distanced from P&S unit 250 by at least 100 kilometers or even 1000 kilometers.

Encoding Engine

In some embodiments of the invention, encoding engine 124 is configured with default parameter values which are used whenever the information from parameter selector 222 is not complete, for example due to errors, or due to deliberate dropping of headers which match the default parameter values, in order to reduce transmission overhead caused by the parameter values.

The encoded video stream from encoding engine 124 may be stored in a further storage unit (not shown), for example to allow network personal video recorder (NPVR) services, without requiring repeated transcoding.

Alternatives

Rather than transmitting streams with parameter values of a single second compression format, server 232 may transmit video streams with parameter values relating to a plurality of compression formats. Each transcoder 210 may then use the parameter values it requires for its transcoding and ignore those it does not require. In some embodiments of the invention, a single transcoder 210 transcodes a single video stream into a plurality of different compression formats for different clients 112. Alternatively or additionally, transcoder 210 converts different video streams received thereby into different compression formats.

Alternatively to transcoder 210 converting a compressed video stream from one compression type to another, transcoder 210 may use the parameter values from parameter selector 222 to convert a video stream from one bandwidth size to another, for example in order to fit on a smaller channel leading to a specific client 112. In some embodiments of the invention, transcoder 210 is utilized to down sample the video stream to a lower resolution, for example, from a high definition (HD) to a standard definition (SD) format. Optionally, in these embodiments, transcoder 210 down samples the video stream after the stream is decoded by decoder 120 and then encoding engine 124 encodes the down sampled stream. The parameter values received from parameter selector 222 may pertain to one or both of the down sampling and encoding.

Compression Methods

Although reference was made to the MPEG-2 and H.264 compression formats, the principles of the present invention may be used with substantially any other compression methods, including for example, Windows media video (WMV9) compression, VC-9, common intermediate format (CIF), QCIF and Dirac compression methods. In some embodiments of the invention, video streams in the first compression format are more compact than video streams in the second compression format, so that the transmission over network 108 requires minimal bandwidth.

Figure 4:
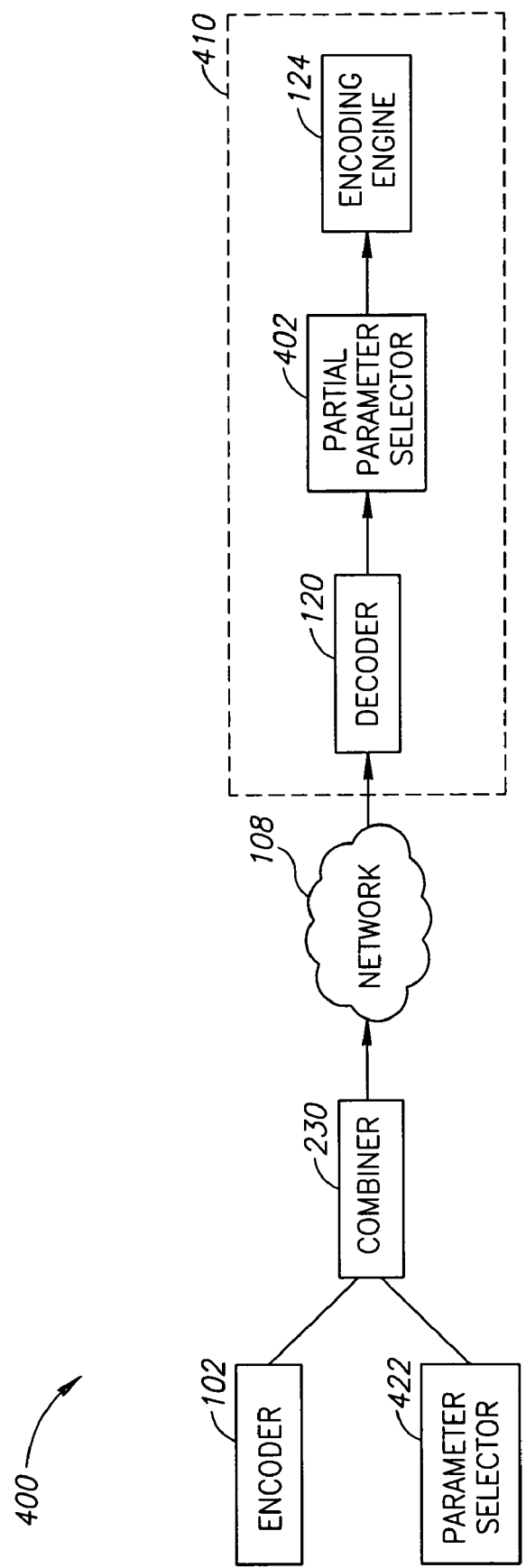
FIG. 4 is a block diagram of a video distribution system, in accordance with another exemplary embodiment of the invention.

FIG. 4 is a block diagram of a video distribution system 400, in accordance with another exemplary embodiment of the invention. FIG. 4 is simplified and shows only elements important for the following description. System 400 differs from the embodiment of FIG. 2 in that its transcoder 410 includes a partial parameter selector 402, which selects some of the parameters of the compression using any method known in the art. Nevertheless, the values of one or more parameters, are determined in advance by parameter selector 422. For example, parameter selector 422 may select the frame types and motion vectors, while selector 402 selects the quantization and macro-block type.

Further Transcoding

As mentioned above, in some embodiments of the invention, the transcoded stream from transcoder 210 is further transcoded by a rate transcoder 240. Rate transcoder 240 may operate in accordance with substantially any method known in the art. In some embodiments of the invention, the video streams include auxiliary information to aid rate transcoder 240 in performing its task. This auxiliary information is different from the parameter values used by transcoder 210. The auxiliary information may include for example compression hints, as described for example in the above mentioned US patent publication 2001/047517. Alternatively or additionally, the auxiliary information comprises replacement blocks as described, for example, in PCT application PCT/IL2005/001326, the disclosure of which is incorporated herein by reference.

While transcoders 210 and 240 may be separate entities, possibly located in separate locations, transcoders 210 and 240 may alternatively be included in a single housing, for example may both be implemented by software on a common processing unit.

Conclusion

It will be appreciated that the above described methods may be varied in many ways, including, changing the order of steps, and/or performing a plurality of steps concurrently. It should also be appreciated that the above described description of methods and apparatus are to be interpreted as including apparatus for carrying out the methods and methods of using the apparatus. The present invention has been described using non-limiting detailed descriptions of embodiments thereof that are provided by way of example and are not intended to limit the scope of the invention. Many specific implementation details may be used.

It should be understood that features and/or steps described with respect to one embodiment may be used with other embodiments and that not all embodiments of the invention have all of the features and/or steps shown in a particular figure or described with respect to one of the embodiments. Variations of embodiments described will occur to persons of the art. Furthermore, the terms "comprise," "include," "have"

and their conjugates, shall mean, when used in the claims, "including but not necessarily limited to."

It is noted that some of the above described embodiments may describe the best mode contemplated by the inventors and therefore may include structure, acts or details of structures and acts that may not be essential to the invention and which are described as examples. Structure and acts described herein are replaceable by equivalents which perform the same function, even if the structure or acts are different, as known in the art. Therefore, the scope of the invention is limited only by the elements and limitations as used in the claims.

We claim:

1. A method of delivering a video stream, comprising:
   encoding a video stream into a first encoded stream;
   selecting encoding parameter values, which are not a part of the first encoded stream, for subsequent transcoding the first encoded stream into a specific second encoded stream;
   transmitting the first encoded stream and the selected encoding parameter values to a transcoder over a standard communication network;
   transcoding the first encoded stream into a second encoded stream in accordance with the selected parameter values, by the transcoder; and
   forwarding the second encoded stream, from the transcoder,
   wherein the first encoded stream is decodable on its own by clients supporting a format of the first encoded stream, without the selected encoding parameters.

2. A method according to claim 1, wherein transmitting the first encoded stream comprises transmitting to a transcoder over a standard communication network, over a distance of at least 1 kilometer.

3. A method according to claim 2, wherein transmitting the first encoded stream comprises transmitting to a plurality of transcoders.

4. A method according to claim 1, wherein transmitting the first encoded stream comprises transmitting over an Ethernet, IP cable or satellite network.

5. A method according to claim 1, wherein transcoding the first encoded stream into a second stream comprises decoding the first encoded stream into a non-encoded stream and re-encoding the non-encoded stream into the second encoded stream.

6. A method according to claim 1, wherein the second encoded stream is larger than the first encoded stream by at least 20%.

7. A method according to claim 1, wherein the first and second encoded streams differ in the resolution of the video stream.

8. A method according to claim 1, wherein the first and second encoded streams differ in their encoding method.

9. A method according to claim 8, wherein transcoding the first encoded stream into a second encoded stream comprises transcoding an H.264 stream into an MPEG-2 stream.

10. A method according to claim 1, wherein transmitting the first encoded stream and the selected encoding parameter values comprises transmitting all parameter values required for generating the second encoded stream.

11. A method according to claim 1, wherein transmitting the first encoded stream and the selected encoding parameter values comprises transmitting fewer than all the parameter values required for generating the second encoded stream.

12. A method according to claim 11, wherein transmitting the first encoded stream and the selected encoding parameter values comprises transmitting motion vector values.

13. A method according to claim 1, wherein transmitting the first encoded stream and the selected encoding parameter values comprises transmitting values for one or more specific parameters, for more than 90% of the video stream.

14. A method according to claim 1, comprising transcoding the second encoded stream into a third encoded stream.

15. A method according to claim 14, wherein transcoding the second encoded stream into a third encoded stream comprises transcoding after the forwarding of the second stream.

16. A method according to claim 14, wherein transcoding the second encoded stream into a third encoded stream comprises decoding the second stream into a non-encoded stream and then encoding into the third encoded stream.

17. A method according to claim 1, wherein transmitting the first encoded stream and the selected encoding parameter values comprises transmitting the first encoded stream and the selected parameter values in a combined video stream.

18. The method according to claim 1, wherein the selected encoding parameter values do not add video content to the first encoded stream.

19. The method according to claim 1, wherein selecting encoding parameter values for subsequent transcoding comprises selecting parameters derivable from the first encoded stream.

20. The method according to claim 1, wherein selecting encoding parameter values for subsequent transcoding comprises selecting parameters not derivable from the first encoded stream.

21. A method of delivering a video stream, comprising:
    receiving, over a standard communication network, a first encoded video stream together with separate encoding parameter values, which are not a part of the first encoded video stream, combined thereto;
    transcoding the first encoded stream into a second encoded stream in accordance with the encoding parameter values, received with the stream; and
    forwarding the second encoded stream.

22. A method according to claim 21, wherein receiving encoding parameter values comprises receiving values of at least one encoding parameter for at least 95% of the video stream.

23. A method according to claim 21, wherein receiving encoding parameter values comprises receiving values of at least three encoding parameters for at least 80% of the video stream.

24. A method according to claim 21, wherein receiving encoding parameter values comprises receiving motion vector values.

25. A transcoder, comprising:
    a network interface;
    a processor configured to receive an encoded video stream through the network interface, together with separate encoding parameter values, which are not a part of the encoded video stream, combined to the encoded video stream and to transcode the received encoded video stream into a different encoded video stream in accordance with the received encoding parameter values.

26. A transcoder according to claim 25, wherein the processor is configured to decode the received encoded video stream into a non-compressed video stream and to re-encode the non-compressed video stream in transcoding the received encoded video stream.

27. A transcoder according to claim 25, wherein the processor is configured to generate the different encoded video stream substantially entirely according to received encoding parameter values and without selection of parameter values.

28. A transcoder according to claim 25, wherein the processor is configured to generate the different encoded video stream with received parameter values of a plurality of different parameters for at least 90% of the video stream.

29. A video server, comprising:
- an input interface for receiving video streams;
- an encoder configured to compress video streams received through the input interface according to a first encoding format;
- a parameter selector configured to select values for one or more parameters of a second encoding format, for the received video streams, wherein the selected parameters are not a part of the received video streams as compressed by the encoder into the first encoding format; and
- an output interface configured to transmit video streams compressed by the encoder with corresponding parameter values selected by the parameter selector combined to the video stream, toward a transcoder.

30. A video server according to claim 29, wherein the parameter selector is configured to select only a single value for at least 95% of the parameter instances for which it selects values.

31. A video server according to claim 30, wherein the parameter selector is configured to select only a single value for at least 99% of the parameter instances for which it selects values.

32. A video server according to claim 29, wherein the output interface is configured to transmit compressed video streams with corresponding parameter values, including only a single value for at least one encoding parameter, for at least 99% of the video stream.

33. A method of transcoding a video stream, comprising:
- receiving a video stream in a first format;
- receiving motion vector values for transcoding the video stream into a second format, which values are not a part of the video stream in the first format; and
- transcoding the received video stream into the second format using the received motion vector values.

34. A method according to claim 33, wherein receiving the motion vector values comprises receiving together with the video stream.

35. A method according to claim 33, wherein receiving the motion vector values comprises receiving the motion vector values and the video stream separately.

\* \* \* \* \*